(12) United States Patent
Peng et al.

(10) Patent No.: US 10,986,111 B2
(45) Date of Patent: Apr. 20, 2021

(54) DISPLAYING A SERIES OF EVENTS ALONG A TIME AXIS IN ENTERPRISE THREAT DETECTION

(71) Applicant: SAP SE, Walldorf (DE)

(72) Inventors: Wei-Guo Peng, Dallau (DE); Lin Luo, Wiesloch (DE); Hartwig Seifert, Elchesheim-Illingen (DE); Nan Zhang, Schriesheim (DE); Harish Mehta, Wiesenbach (DE); Florian Chrosziel, St. Leon-Rot (DE); Rita Merkel, Ilvesheim (DE); Eugen Pritzkau, Wiesloch (DE); Jona Hassforther, Heidelberg (DE); Thorsten Menke, Bad Iburg (DE); Thomas Kunz, Lobbach/Lobenfeld (DE); Kathrin Nos, Nussloch (DE); Marco Rodeck, Maikammer (DE)

(73) Assignee: SAP SE, Walldorf (DE)

( * ) Notice: Subject to any disclaimer, the term of this patent is extended or adjusted under 35 U.S.C. 154(b) by 79 days.

(21) Appl. No.: 15/847,478

(22) Filed: Dec. 19, 2017

(65) Prior Publication Data
US 2019/0190935 A1    Jun. 20, 2019

(51) Int. Cl.
| G06F 3/0485 | (2013.01) |
| H04L 29/06 | (2006.01) |
| G06F 3/0482 | (2013.01) |
| G06F 21/55 | (2013.01) |
| G06F 3/0484 | (2013.01) |

(52) U.S. Cl.
CPC ........ *H04L 63/1425* (2013.01); *G06F 3/0482* (2013.01); *G06F 3/04842* (2013.01); *G06F 21/552* (2013.01); *H04L 63/0227* (2013.01); *G06F 3/0485* (2013.01); *G06F 2203/04806* (2013.01)

(58) Field of Classification Search
CPC .... G06F 21/552; G06F 3/0482; G06T 11/206; G06T 2200/24; H04L 63/1425
See application file for complete search history.

(56) References Cited

U.S. PATENT DOCUMENTS

| 5,440,726 A | 8/1995 | Fuchs |
| 5,960,170 A | 9/1999 | Chen |
| 6,173,418 B1 | 1/2001 | Fujino et al. |
| 6,629,106 B1 | 9/2003 | Narayanaswamy |
| 6,779,001 B1 | 8/2004 | Kanai et al. |
| 7,376,969 B1 | 5/2008 | Njemanze |
| 7,380,205 B2 | 5/2008 | Bezrukov et al. |

(Continued)

OTHER PUBLICATIONS

Non-Final Office Action issued in U.S. Appl. No. 15/639,863 dated Jun. 24, 2019,37 pages.

(Continued)

*Primary Examiner* — Olugbenga O Idowu
(74) *Attorney, Agent, or Firm* — Fish & Richardson P.C.

(57) ABSTRACT

One or more entities are selected for which logged Events are to be displayed in an Event Series Chart. One or more filters and a timeframe are selected. Events are fetched from one or more selected log files based on the one or more selected filters and the timeframe. The fetched Events are displayed in an Event Series Chart according to an associated timestamp and identification Event property value associated with each fetched Event.

20 Claims, 6 Drawing Sheets

(56) References Cited

U.S. PATENT DOCUMENTS

| | | |
|---|---|---|
| 7,441,197 B2 | 10/2008 | Tschiegg et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Avelbuch |
| 9,979,741 B2 | 5/2018 | Fehrman |
| 10,001,389 B1 | 6/2018 | Das et al. |
| 10,003,605 B2 | 6/2018 | Muddu et al. |
| 10,079,842 B1 | 9/2018 | Brandwine et al. |
| 10,102,379 B1 | 10/2018 | Seifert et al. |
| 10,140,447 B2 | 11/2018 | Rahaman et al. |
| 10,148,675 B2 | 12/2018 | Brandwine et al. |
| 10,681,064 B2 | 6/2020 | Peng et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0109305 A1* | 4/2015 | Black .................. G06Q 10/06 345/440 |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0164891 A1 | 6/2016 | Satish et al. |
| 2016/0202893 A1 | 7/2016 | Mustonen et al. |
| 2016/0226905 A1 | 8/2016 | Baikalov et al. |

(56) References Cited

U.S. PATENT DOCUMENTS

| | | | |
|---|---|---|---|
| 2016/0248798 A1 | 8/2016 | Cabrera et al. | |
| 2016/0291982 A1 | 10/2016 | Mizrahi | |
| 2016/0292061 A1 | 10/2016 | Marron | |
| 2016/0337384 A1 | 11/2016 | Jansson | |
| 2016/0359886 A1 | 12/2016 | Yadav et al. | |
| 2016/0364315 A1 | 12/2016 | Lee | |
| 2016/0364571 A1 | 12/2016 | Lee | |
| 2016/0364740 A1 | 12/2016 | Parker | |
| 2016/0373476 A1 | 12/2016 | Dell'anno et al. | |
| 2016/0378978 A1 | 12/2016 | Singla | |
| 2016/0381049 A1 | 12/2016 | Lakhani | |
| 2017/0004005 A1 | 1/2017 | Elliott | |
| 2017/0026400 A1 | 1/2017 | Adams et al. | |
| 2017/0031002 A1 | 2/2017 | Newton et al. | |
| 2017/0034023 A1 | 2/2017 | Nickolov | |
| 2017/0070415 A1 | 3/2017 | Bell et al. | |
| 2017/0091008 A1 | 3/2017 | Cherbakov | |
| 2017/0093902 A1 | 3/2017 | Roundy et al. | |
| 2017/0148060 A1 | 5/2017 | Showers | |
| 2017/0169217 A1 | 6/2017 | Rahaman | |
| 2017/0185273 A1* | 6/2017 | Marache-Francisco | G06T 11/206 |
| 2017/0195439 A1 | 7/2017 | Dixon et al. | |
| 2017/0251365 A1 | 8/2017 | Burchard | |
| 2017/0270006 A1 | 9/2017 | Kankylas | |
| 2017/0279837 A1 | 9/2017 | Dasgupta | |
| 2017/0287179 A1* | 10/2017 | Tibshirani | G06T 11/206 |
| 2017/0302685 A1 | 10/2017 | Ladnai et al. | |
| 2017/0308602 A1 | 10/2017 | Raghunathan et al. | |
| 2017/0310690 A1 | 10/2017 | Mestha et al. | |
| 2017/0316026 A1 | 11/2017 | Kanthak et al. | |
| 2017/0322993 A1 | 11/2017 | Brodt et al. | |
| 2017/0324766 A1 | 11/2017 | Gonzalez | |
| 2018/0027002 A1 | 1/2018 | Rodeck et al. | |
| 2018/0027010 A1 | 1/2018 | Pritzkau et al. | |
| 2018/0059876 A1 | 3/2018 | Peng et al. | |
| 2018/0063167 A1 | 3/2018 | Rodeck | |
| 2018/0091535 A1 | 3/2018 | Chrosziel | |
| 2018/0091536 A1 | 3/2018 | Chrosziel et al. | |
| 2018/0157835 A1 | 6/2018 | Nos | |
| 2018/0173872 A1 | 6/2018 | Lam et al. | |
| 2018/0173873 A1 | 6/2018 | Hassforther et al. | |
| 2018/0176234 A1 | 6/2018 | Kunz et al. | |
| 2018/0176235 A1 | 6/2018 | Lam et al. | |
| 2018/0176238 A1 | 6/2018 | Nos et al. | |
| 2018/0234447 A1 | 8/2018 | Mueen | |
| 2019/0005423 A1 | 1/2019 | Pritzkau et al. | |
| 2019/0007435 A1 | 1/2019 | Pritzkau et al. | |
| 2019/0190927 A1 | 6/2019 | Peng et al. | |

OTHER PUBLICATIONS

U.S. Office Action in related U.S. Appl. No. 15/383,771 dated Jul. 5, 2019, 16 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

U.S. Office Action in related U.S. Appl. No. 15/274,693 dated Jul. 26, 2018, 14 pages.

U.S. Office Action in related U.S. Appl. No. 15/370,084 dated Aug. 27, 2018, 14 pages.

U.S. Office Action in related U.S. Appl. No. 15/383,771 dated Aug. 3, 2018, 12 pages.

U.S. Office Action in related U.S. Appl. No. 15/216,201 dated Jul. 20, 2018, 15 pages.

U.S. Office Action in related U.S. Appl. No. 15/246,053 dated May 21, 2018, 14 pages.

U.S. Office Action in related U.S. Appl. No. 15/246,053 dated Sep. 24, 2018, 14 pages.

U.S. Office Action in related U.S. Appl. No. 15/253,438 dated Sep. 19, 2018, 17 pages.

U.S. Office Action in related U.S. Appl. No. 15/274,569 dated Nov. 14, 2018, 11 pages.

U.S. Office Action in related U.S. Appl. No. 15/380,379 dated Jul. 19, 2018, 9 pages.

U.S. Office Action in related U.S. Appl. No. 15/380,450 dated Aug. 27, 2018, 19 pages.

U.S. Office Action in related U.S. Appl. No. 15/380,450 dated Jan. 23, 2019, 21 pages.

U.S. Office Action in related U.S. Appl. No. 15/380,450 dated Nov. 2, 2018, 19 pages.

U.S. Office Action in related U.S. Appl. No. 15/381,567 dated Nov. 2, 2018, 17 pages.

U.S. Office Action in related U.S. Appl. No. 15/383,771 dated Jan. 23, 2019, 14 pages.

Final Office Action issued in U.S. Appl. No. 15/370,084 dated Feb. 4, 2019, 16 pages.

Final Office Action issued in U.S. Appl. No. 15/274,693 dated Feb. 11, 2019, 19 pages.

Non-Final Office Action issued in U.S. Appl. No. 15/274,569 dated Mar. 22, 2019, 11 pages.

Non-Final Office Action issued in U.S. Appl. No. 15/216,046 dated Apr. 29, 2019, 23 pages.

Non-Final Office Action issued in U.S. Appl. No. 15/246,053 dated May 17, 2019, 28 pages.

Office Action in related U.S. Appl. No. 15/216,201 dated Mar. 7, 2018; 14 pages.

Office Action in related U.S. Appl. No. 15/274,569 dated Apr. 16, 2018; 11 pages.

Final Office Action issued in U.S. Appl. No. 15/381,567 dated May 22, 2019, 28 pages.

Non-final office action issued in U.S. Appl. No. 15/381,567 dated Oct. 7, 2019, 17 pages.

Office Action issued in U.S. Appl. No. 15/216,046 dated Aug. 21, 2019, 23 pages.

* cited by examiner

DISPLAYING A SERIES OF EVENTS ALONG A TIME AXIS IN ENTERPRISE THREAT DETECTION

CROSS-REFERENCE TO RELATED APPLICATION

This application is a co-pending application of and filed in conjunction with U.S. application Ser. No. 15/847,450, filed on Dec. 19, 2017 entitled "ANALYSIS OF COMPLEX RELATIONSHIPS AMONG INFORMATION TECHNOLOGY SECURITY-RELEVANT ENTITIES USING A NETWORK GRAPH"; the entire contents of each and as a whole, are incorporated herein by reference.

BACKGROUND

Enterprise threat detection (ETD) typically collects and stores a large amount/large sets of log data associated with various heterogeneous entities (often referred to as "big data"). For example, entities can include computing systems, users, servers, proxies, clients, and firewalls. The stored data can be analyzed computationally using forensic-type data analysis tools to identify suspicious behavior in revealed patterns, trends, interactions, and associations, especially relating to ETD behavior. Appropriate responses can then be taken if malicious behavior is suspected or identified. Each entry or logically related entries in the log data can be treated as an Event. A particular Event is usually identified by a name property and contains a timestamp indicating when the particular Event was triggered. Other properties can be associated with Events, based mostly upon a particular Event type. Current ETD functionality makes it difficult pinpoint individual Events that may be crucial in a forensic investigation.

SUMMARY

The present disclosure describes displaying a series of Events along a time axis in enterprise threat detection (ETD).

In an implementation, one or more entities are selected for which logged Events are to be displayed in an Event Series Chart. One or more filters and a timeframe are selected. Events are fetched from one or more selected log files based on the one or more selected filters and the timeframe. The fetched Events are displayed in an Event Series Chart according to an associated timestamp and identification Event property value associated with each fetched Event.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, ETD currently displays an aggregated distribution of Events. While the aggregated distribution of Events can reveal a frequency of when Events have taken place, the aggregated distribution hides individual Events and makes it difficult to find out exactly when a particular Event was triggered. In particular, it is almost impossible to pinpoint a single or rarely-occurring Event that may be crucial in a forensic investigation and success of an anomaly detections, the described technique permits faster and more accurate detection of the single or rarely-occurring Events by setting an emphasis on Events instead of Event distribution. Non-aggregated Event data permits easier observation of Event properties. Second, as Events are displayed in a linear manner (for example, in horizontal "Lanes" that share the same time axis), it is easy to recognize Event clusters where Events are congested or spot a time period when nothing has happened (that is, no Events). Each Event is represented with a point/shape (for example, a circle, square, or triangle) and is located relative to a time axis at a position corresponding to its individual timestamp. Additionally, shape, color, and size of an Event representation can be varied based on particular properties associated with the Event. Various patterns of Events along the time axis can also reveal valuable information to help trace suspicious activities. Third, the described technique can enhance an ETD experience for a user in a graphical user interface by permitting: 1) zooming to obtain either a detailed view of a particular timestamp or an overview of a timeframe along the time axis; 2) panning of a series of Events along the time axis (for example, by drag-and-drop operations); 3) filtering by Event properties; 4) use of tooltips to display properties of an Event (for example, on a mouseover-type GUI event); and 5) display of the time axis on both the top and bottom of the graphical user interface to ensure that at least one time axis is visible to a user.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
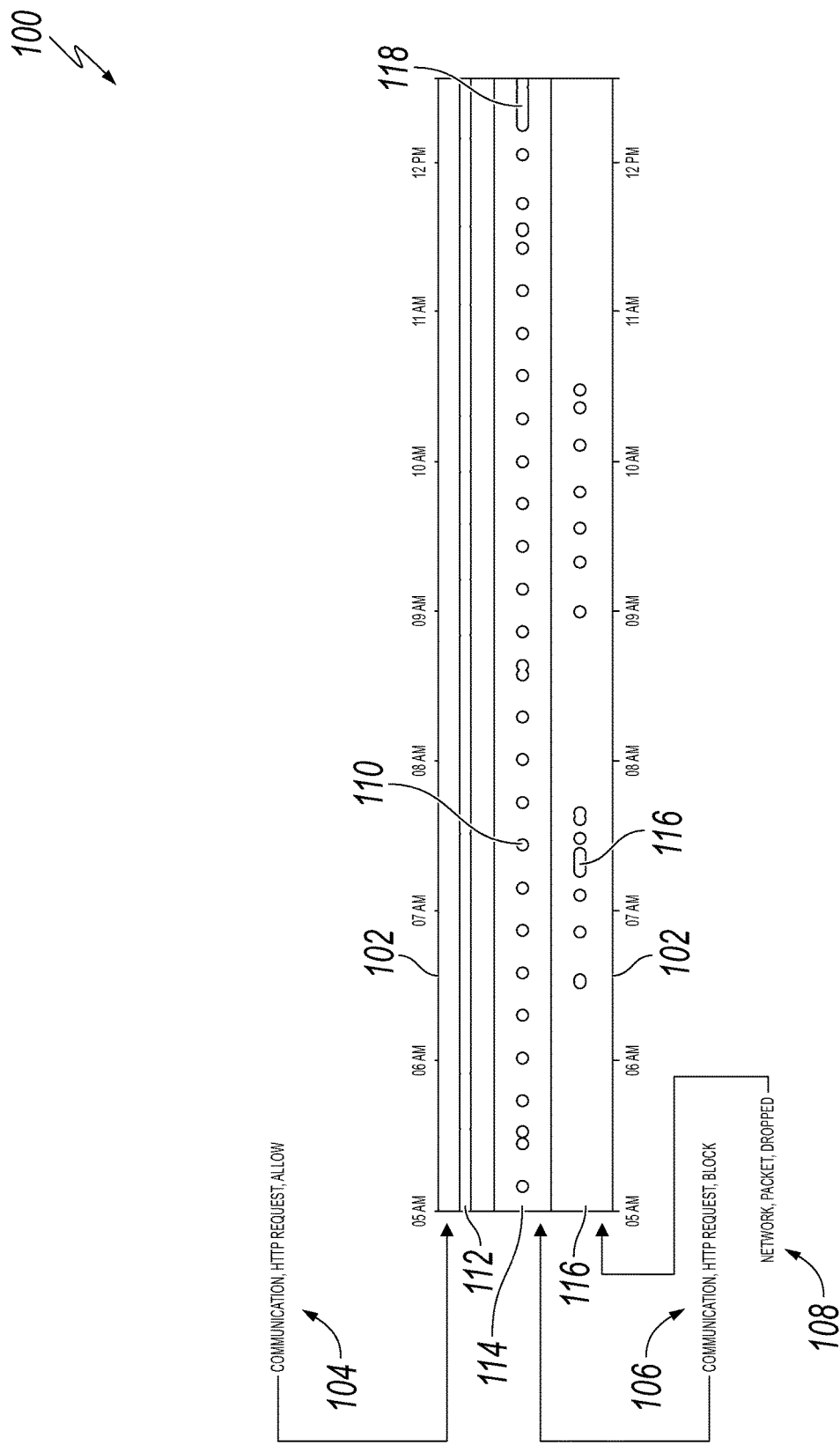
FIG. 1 is a screenshot of an Event Series Chart illustrating an example series of Events of a client device accessing a website using a Hypertext Transfer Protocol (HTTP) proxy, according to an implementation of the present disclosure.

The following detailed description describes displaying a series of Events along a time axis in enterprise threat detection (ETD), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

ETD typically collects and stores a large amount/large sets of log data associated with various heterogeneous entities (often referred to as "big data"). For example, entities can include computing systems, users, servers, proxies, clients, and firewalls. The stored data can be analyzed computationally using forensic-type data analysis tools to identify suspicious behavior in revealed patterns, trends, interactions, and associations, especially relating to ETD behavior. Appropriate responses can then be taken if malicious behavior is suspected or identified. Each entry or logically related entries in the log data can be treated as an Event. A particular Event is usually identified by an identification (for example, a name) Event property value and contains a timestamp indicating when the particular Event was triggered. Other properties can be associated with Events, based mostly upon a particular Event type. Current ETD functionality makes it difficult pinpoint individual Events that may be crucial in a forensic investigation.

Currently, ETD displays an aggregated distribution of Events. While the aggregated distribution of Events can reveal a frequency of when Events have taken place, the aggregated distribution hides individual Events and makes it difficult to find out exactly when a particular Event was triggered. In particular, it is almost impossible to pinpoint a single or rarely-occurring Event that may be crucial in a forensic investigation for successful anomaly detection.

The described technique permits faster and more accurate detection of the rarely-occurring Events by setting an emphasis on Events instead of Event distribution. This is because non-aggregated Event data is easier to select in order to observe Event properties.

At a high-level, Events are displayed in a graphical user interface (GUI) in a linear manner (for example, in horizontal "Lanes" that share the same time axis). Accordingly, it is easy to recognize Event clusters where Events are congested or spot a time period when nothing has happened (that is, no Events).

In some implementations, each Event can be represented with a graphical indicator—a point/shape (for example, a circle, square, or triangle)—located relative to a time axis at a position corresponding to its individual timestamp. Additionally, shape, color, and size of an Event representation can be varied based on particular properties associated with the Event. Various patterns of Events along the time axis can also reveal valuable information to help trace suspicious activities.

The described technique can enhance an ETD experience for a user in a GUI by permitting: 1) zooming to obtain either a detailed view of a particular timestamp or an overview of a timeframe along the time axis; 2) panning of a series of Events along the time axis (for example, by drag-and-drop operations); 3) filtering by Event properties; 4) use of tooltips to display properties of an Event (for example, on a mouseover-type GUI event); and 5) display of the time axis on both the top and bottom of the GUI to ensure that at least one time axis is visible to a user.

In some implementations, Event properties can be used as filter. For example, a time filter allows a user to specify in which timeframe/period that Events should be displayed in the GUI. Moreover, zooming and panning can change a user's perspectives to view Events. For example, in zooming (that is, in/out) can reduce or enlarge a particular timeframe by reducing or expanding the timeframe (for example, from 8 to 4 hours) to provide a rougher or a more detailed view, respectively, or vice versa. In panning, times associated with a particular timeframe can modified. As a particular example, if the timeframe is from 0500 to 1100 (6 hours), panning can change the boundary times of the 6 hour timeframe to 0200 to 0800.

FIG. 1 is a screenshot of an Event Series Chart 100 illustrating an example series of Events of a client device (that is, Internet Protocol (IP) Address) accessing a website using a Hypertext Transfer Protocol (HTTP) proxy, according to an implementation of the present disclosure. The Event Series Chart 100 includes two identical time axes 102 (from "05 AM" to sometime past "12 PM") at the top and bottom of the Event Series Chart 100. As previously discussed and in some implementations, the Event Series Chart 100 displays Events in horizontal Lanes that share the same time axis 102.

Events are displayed in the Event Series Chart 100 as circular dots (for example, Event 110). For example, "Communication, HTTP Request, Allow" 104, "Communication, HTTP Request, Block" 106, and "Network, Packet, Dropped" 106. Events 104, 106, and 108 are distributed along the timeframe of the time axes 102 according to individual Event timestamp property values.

An interpretation of the Event Series Chart 100 can be that most received HTTP requests are passed through the mentioned HTTP proxy (that is, allowed) and indicated as Events 104. Also, there are many Events 104 as the distribution of Events 104 in lane 112 along the time axes 102 looks almost continuous. The distribution of Events 106 in lane 114 reveals that some of the Events 104 were blocked (indicated as Events 106). The distribution of Events 108 in lane 116 reveals that several network packets were dropped from incoming HTTP requests (indicated as Events 108).

Of note, sometime after 12 PM on the time axes 102, a cluster 118 of Events 106 can be seen (that is, HTTP requests were blocked). Also, between 07 AM and 08 AM, a cluster 120 of Events 108 can be seen (that is, network packets were dropped). These clusters may be worthy of additional investigation in an ETD forensic environment.

In some implementations, the Event Series Chart 100 can be configured to provide functionality to zoom in/out with respect to the timeframe of the displayed time axes 102. For example, the Event Series Chart 100 time axes 102 could be zoomed-in upon where a truncated timeframe from 05 AM to 08 AM would be displayed in the same amount of computer display real estate and providing a more detailed view of associated Events. This would have the effect of increasing the space between the Events 104 in lane 112 (for example, similar to that of Events 106 in lane 114) to make Events 104 easier to select, hover over for tooltip information, or interact with in any way consistent with this disclosure. In some instances, scrolling of a wheel on a computer-mouse-type interface device or configured +/− zoom-type GUI buttons could be used to perform the mentioned zoom in/out of the time axes 102.

While the Event Series Chart 100 is displayed in a horizontal format, other layouts/implementations are possible. For example, in some implementations, the Event Series Chart 100 can be configured to permit the Event Series Chart 100 to be placed into a vertical or other orientation.

In some implementations, the displayed timeframe of the Event Series Chart 100 can be zoomed (that is, in/out) or panned. For example, a drag-and-drop operation can be used with the Event Series Chart 100 to scroll time axes 102 to either increase or decrease the time values with respect to the current timeframe represented by the time axes 102. As a particular example, the time axes 102 (from "05 AM" to sometime past "12 PM"—somewhat over 7 hours) cam be scrolled backwards in time to reflect a timeframe from "02 AM" to sometime past "09 AM". Some implementations of the Event Series Chart 100 can provide a settings-type dialog to enter time or other values to adjust time values with relation to the time axes 102.

Figure 2:
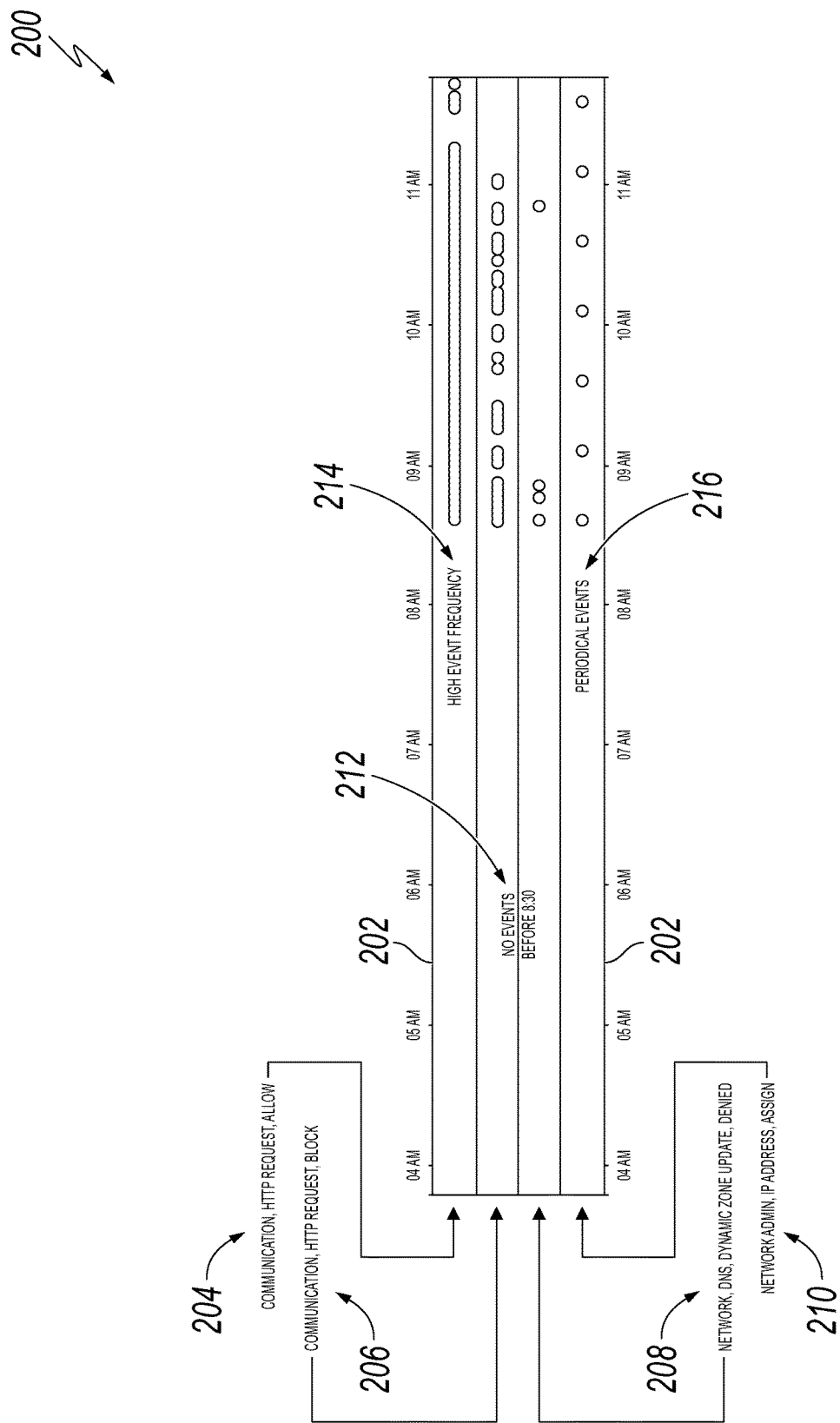
FIG. 2 is a screenshot illustrating an example annotated series of Events over a time period of 8 hours, according to an implementation of the present disclosure.

FIG. 2 is a screenshot of an Event Series Chart 200 illustrating an example annotated series of Events over a time period of 8 hours, according to an implementation of the present disclosure. The Event Series Chart 200 includes two identical time axes 202 (from "04 AM" to sometime past "11 AM") at the top and bottom of the Event Series Chart 200.

As in FIG. 1, Events are displayed in the Event Series Chart 200 as circular dots. For example, "Communication, HTTP Request, Allow" 204, "Communication, HTTP Request, Block" 206, "Network, DNS, Dynamic Zone Update, Denied" 208, and "Network Admin, IP Address, Assign" 210. Events 204, 206, and 208, and 210 are distributed along the timeframe of the time axes 202 in Lanes according to individual Event timestamp property values.

Annotations in FIG. 2 reveal that there are no Events prior to 0830 (annotation 212), Events 204 occur with high frequency (annotation 214) similar to the distribution of Events 104 in lane 112 of FIG. 1, and Events 210 are periodic in nature (annotation 216). As displayed in the Event Series Chart 200, Events 206, 208, and 210 occur with less frequency. As previously mentioned, Events 208 are periodic in nature and occur regularly every 30 minutes.

Figure 3:
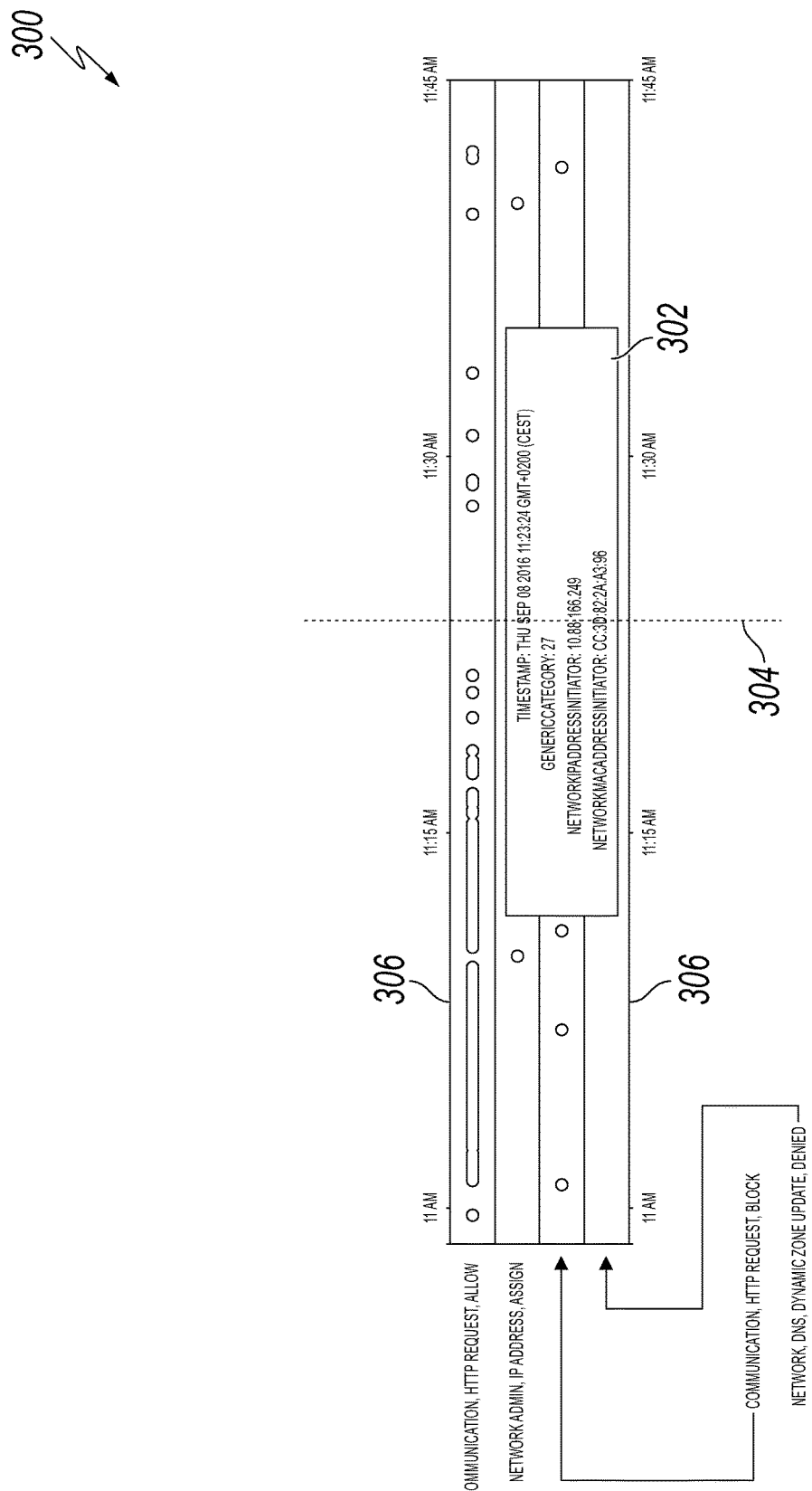
FIG. 3 is a screenshot of an example series of Events in an Event Series Chart with data of a particular Event displayed within an Event tooltip, according to an implementation of the present disclosure.

FIG. 3 is a screenshot of an example series of Events 300 in an Event Series Chart with data of a particular Event displayed within an Event tooltip, according to an implementation of the present disclosure. Tooltip 302 displays data associated with a particular Event (not illustrated) under the displayed tooltip 302 (for example, an Event at timestamp 304 (11:23:24 GMT+200 (CEST))). The tooltip 302 indicates that the Event is of "GenericCategory: 27", a "NetworkIPAddressInitiator: 10:88:166:249", and "NetworkMACAddressInitiator: CC:3D:82:2A:A3:96".

In some implementations, the displayed tooltip 302 can be activated in the Event Series Chart 300 by a mouseover-type GUI event, click-type GUI event, or other selection-type GUI event or data request (for example, a GUI dialog to enter Event-identifying information—such as a timestamp) related to the Event displayed in the Event Series Chart 300.

As previously noted, the Event Series Chart 300 contains two identical time axes 306 in case the tooltip 302 happens to cover a portion of one of the two time axes 306. In some implementations, tooltip 302 can be moved (for example, a drag-and-drop type operation using a computer mouse or touch screen) to permit viewing the entirety of the Event Series Chart 300. In some implementations, the tooltip 302 can be opaque to permit limited viewing of underlying graphical Event indicators or other information (for example, time axes 306 values).

Figure 4:
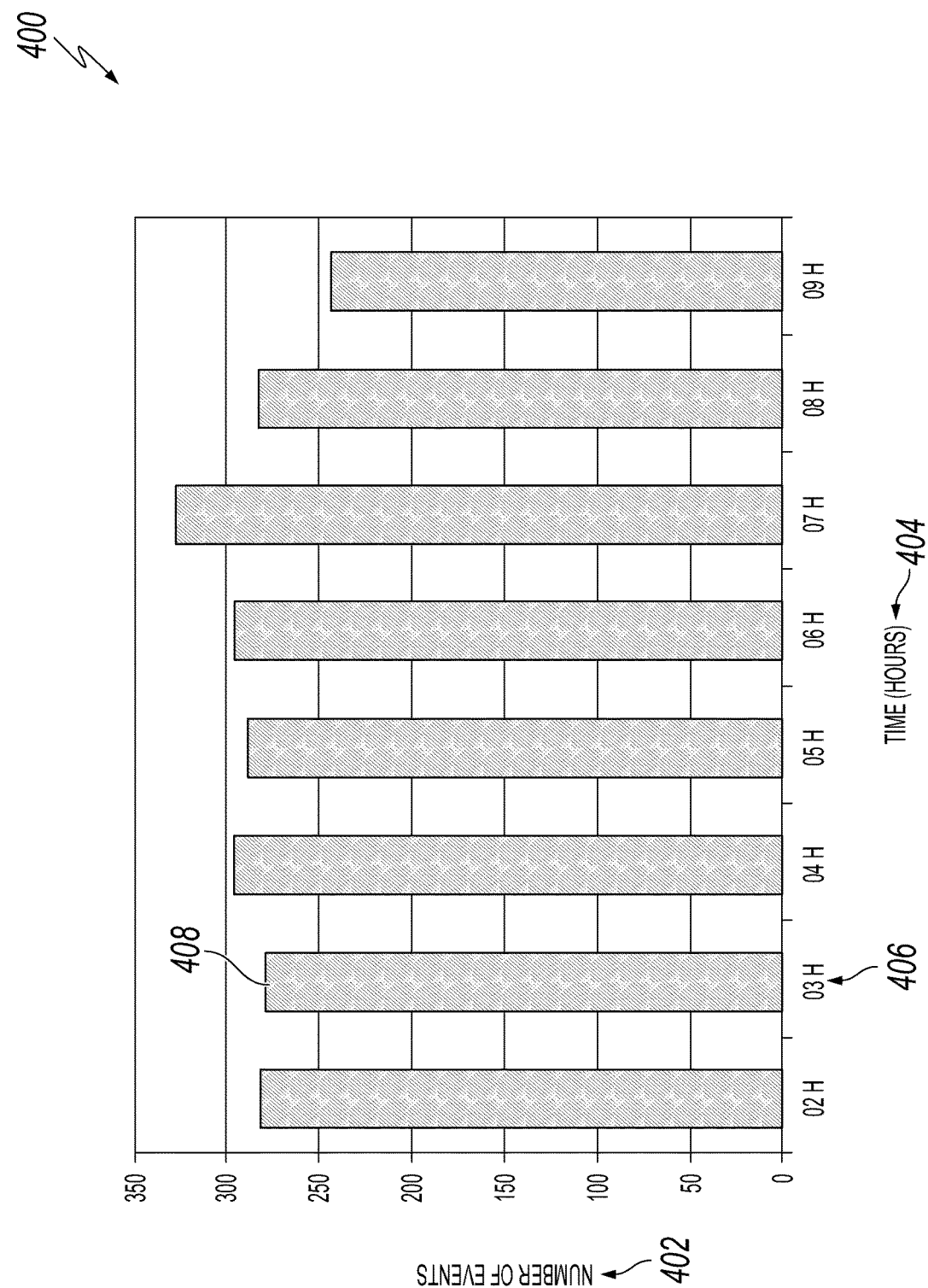
FIG. 4 is a screenshot illustrating an example distribution of a number of Events over a time period of 8 hours, according to an implementation of the present disclosure.

FIG. 4 is a screenshot of a Distribution Graph 400 illustrating an example distribution of a number of Events over a time period of 8 hours, according to an implementation of the present disclosure. Distribution Graph 400 has a vertical axis 402 representing number of Events and a horizontal axis 404 representing time in hours.

Where the described Event Series Chart displays Events in relation to time, Distribution Graph 400 permits an alternative view of values (for example, associated with/related to Events—such as, the illustrated number of Events, Event severity, or other values consistent with this disclosure) in relation to time. For example, at hour "03h" 406, the number of events represented by bar 408 is approximately 280, but individual events are not visible as in an Event Series Chart.

In some implementation a particular graph bar can be configured in a GUI to be selectable (for example, with a selection-type GUI event) to provide detailed information associated with events associated with hour "03" 306. For example, selecting bar 408 might render an Event Series Chart filtered by a timeframe of 0300 to 0359 or other chart, diagram, or display to provide information on the approximately 280 Events represented by bar 408. In some implementations, more than one bar in the Distribution Graph 400 can be selected to act as filters for Events.

In some implementations, a described Event Series Chart or a Distribution Graph with respect to time can be configured to send messages, instructions, or other communications to a computer-implemented controller, database, or other computer-implemented system to dynamically initiate control of, control, or cause another computer-implemented system to perform a computer-implemented or other function/operation. For example, operations based on an Event(s) or other data displayed on an Event Series Chart or a Distribution Graph can be transmitted to cause operations associated with a database to perform storage efficiency, data retrieval, or other operations consistent with this disclosure. In another example, adjusting the timeframe associated with the time axes (for example, time axes 102)—such as zooming in/out or scrolling to an earlier or later timeframe—can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (for example, a mechanical alarm/light emitting device) as a notification of detected malicious behavior(s) with respect to a computing system being monitored/analyze by an ETD system.

Figure 5:
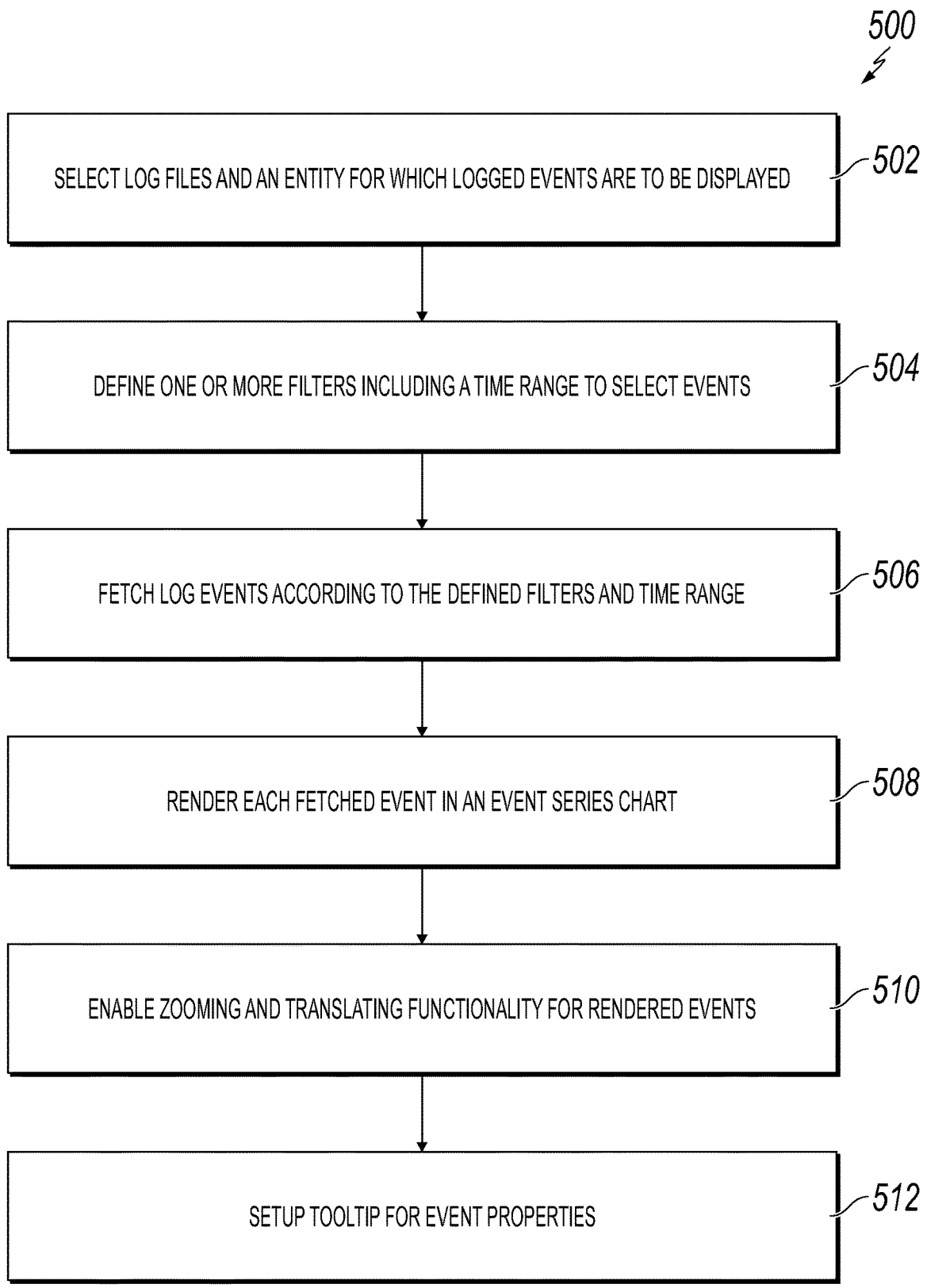
FIG. 5 is a flowchart illustrating an example of a computer-implemented method for displaying a series of Events along a time axis in enterprise threat detection (ETD), according to an implementation of the present disclosure.

FIG. 5 is a flowchart illustrating an example of a computer-implemented method 500 for displaying a series of Events along a time axis in ETD, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, particular log files can be selected for ETD analysis. One or more entities are selected for which logged Events are to be displayed in an Event Series Chart from the selected log files. For example, a proxy server can be selected as the entity. From 502, method 500 proceeds to 504.

At 504, one or more filters, including a timeframe are selected. From 504, method 500 proceeds to 506.

At 506, Events are fetched from the selected log files according to the defined one or more filters and the timeframe. From 506, method 500 proceeds to 508.

At 508, each fetched Event is displayed in an Event Series Chart. In typical implementations, the Events are displayed according to an associated timestamp and an identification (for example, a name) Event property value associated with each fetched Event. For example, in FIG. 2, Events 104 are displayed according to an Event name "Communication, HTTP Request, Allow" and a particular timestamp. From 508, method 500 proceeds to 510.

At 510, zooming and panning functionality is enabled for the Event Series Chart. For example, the timeframe represented by the two time axes can be zoomed in/out or the timeframe panned to represent earlier or later times. From 510, method 500 proceeds to 512.

At 512, tooltip functionality is enabled for properties associated with each displayed Event. In some implementations, tooltips are displayed following a mouseover-type GUI event, click-type GUI event, or other selection-type GUI event or data request related to a particular Event displayed in the Event Series Chart. After 512, method 500 stops.

Figure 6:
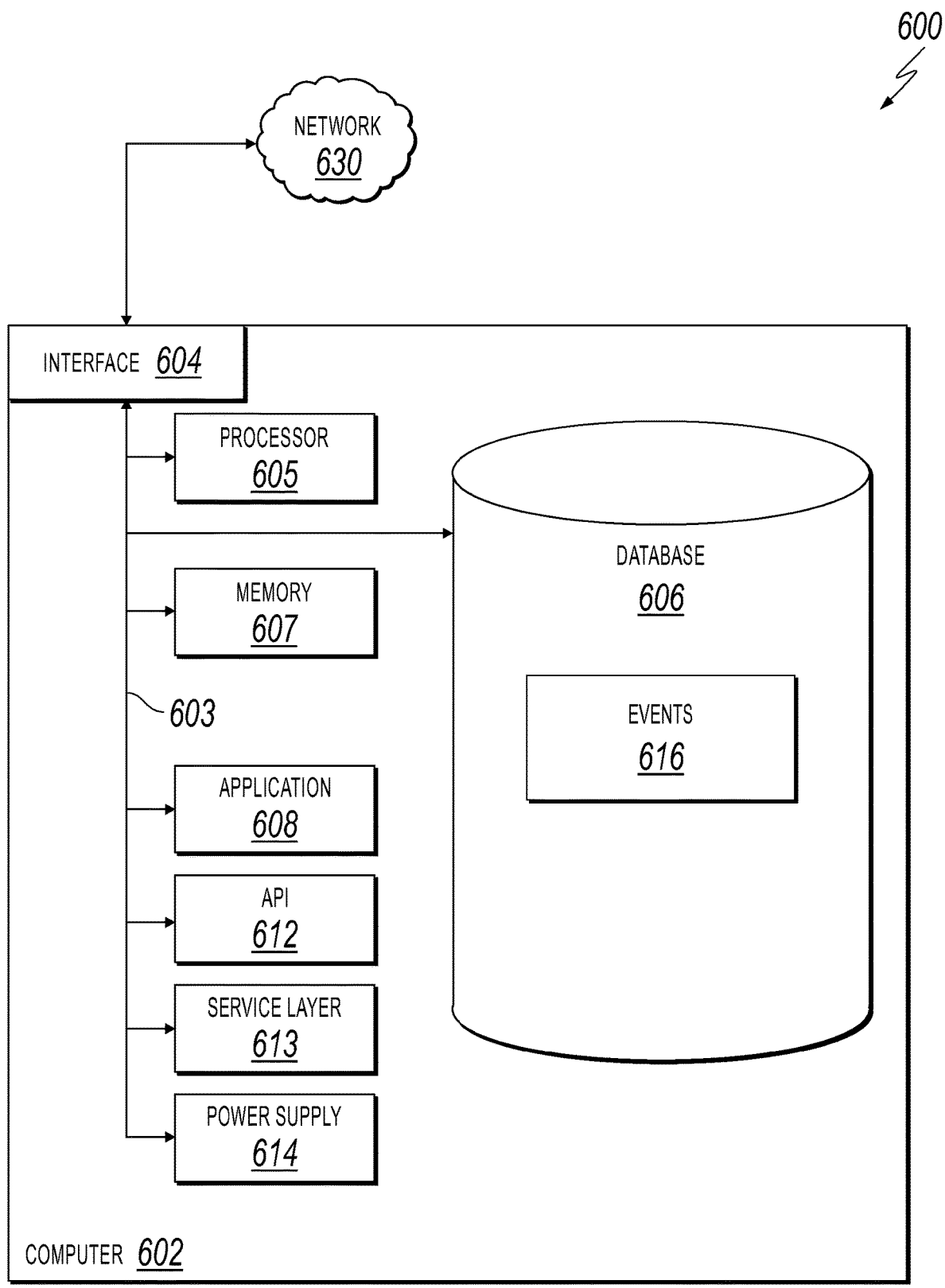
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. As illustrated, the Database 606 holds at least the previously described Events 616.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client", "user", or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: selecting one or more entities for which logged Events are to be displayed in an Event Series Chart; selecting one or more filters and a timeframe; fetching Events from one or more selected log files based on the one or more selected filters and the timeframe; and displaying the fetched Events in an Event Series Chart according to an associated timestamp and identification Event property value associated with each fetched Event.

The foregoing and other described implementations can each, optionally, include one or more of the following features:

A first feature, combinable with any of the following features, comprising selecting the one or more log files for ETD analysis containing logged Events associated with the selected one or more entities.

A second feature, combinable with any of the previous or following features, wherein the entity can be selected from the group consisting of computing systems, users, servers, proxies, clients, and firewalls.

A third feature, combinable with any of the previous or following features, wherein the filter is based on a property associated with an Event.

A fourth feature, combinable with any of the previous or following features, wherein the Event Series Chart comprises two identical time axes.

A fifth feature, combinable with any of the previous or following features, comprising enabling zooming and panning functionality for the Event Series Chart.

A sixth feature, combinable with any of the previous or following features, comprising enabling tooltip functionality for property values associated with each displayed Event in the Event Series Chart.

In a second implementation, a non-transitory, computer-readable medium storing one or more instructions executable by a computer system to perform operations comprising: selecting one or more entities for which logged Events are to be displayed in an Event Series Chart; selecting one or more filters and a timeframe; fetching Events from one or more selected log files based on the one or more selected filters and the timeframe; and displaying the fetched Events in an Event Series Chart according to an associated timestamp and identification Event property value associated with each fetched Event.

The foregoing and other described implementations can each, optionally, include one or more of the following features:

A first feature, combinable with any of the following features, comprising one or more instructions for selecting the one or more log files for ETD analysis containing logged Events associated with the selected one or more entities.

A second feature, combinable with any of the previous or following features, wherein the entity can be selected from the group consisting of computing systems, users, servers, proxies, clients, and firewalls.

A third feature, combinable with any of the previous or following features, wherein the filter is based on a property associated with an Event.

A fourth feature, combinable with any of the previous or following features, wherein the Event Series Chart comprises two identical time axes.

A fifth feature, combinable with any of the previous or following features, comprising one or more instructions to enable zooming and panning functionality for the Event Series Chart.

A sixth feature, combinable with any of the previous or following features, comprising one or more instructions for enabling tooltip functionality for property values associated with each displayed Event in the Event Series Chart.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: selecting one or more entities for which logged Events are to be displayed in an Event Series Chart; selecting one or more filters and a timeframe; fetching Events from one or more selected log files based on the one or more selected filters and the timeframe; and displaying the fetched Events in an Event Series Chart according to an associated timestamp and identification Event property value associated with each fetched Event.

The foregoing and other described implementations can each, optionally, include one or more of the following features:

A first feature, combinable with any of the following features, comprising one or more instructions for selecting the one or more log files for ETD analysis containing logged Events associated with the selected one or more entities.

A second feature, combinable with any of the previous or following features, wherein the entity can be selected from the group consisting of computing systems, users, servers, proxies, clients, and firewalls.

A third feature, combinable with any of the previous or following features, wherein the filter is based on a property associated with an Event.

A fourth feature, combinable with any of the previous or following features, wherein the Event Series Chart comprises two identical time axes.

A fifth feature, combinable with any of the previous or following features, comprising one or more instructions to enable zooming and panning functionality for the Event Series Chart.

A sixth feature, combinable with any of the previous or following features, comprising one or more instructions for enabling tooltip functionality for property values associated with each displayed Event in the Event Series Chart.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time", "real time", "realtime", "real (fast) time (RFT)", "near(ly) real-time (NRT)", "quasi real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus", "computer", or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface", or "GUI", can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    selecting, by one or more processors, one or more entities for which logged events are to be displayed in an event series chart;
    selecting, by the one or more processors, one or more filters and a timeframe;
    fetching, by the one or more processors, events from one or more selected log files based on the one or more filters and the timeframe;
    generating, by the one or more processors, a display of the fetched events in an event series chart according to an associated timestamp and an identification event property value associated with each fetched event, the event series chart comprising a first portion of the fetched events that occurred with a first frequency that are displayed as a continuous distribution within the timeframe and a second portion of the fetched events that occurred with a second frequency that is lower than the first frequency that are displayed as separate event icons within the timeframe;
    receiving, by the one or more processors, a user input to adjust the display of the fetched events in the event series chart corresponding to a reduced timeframe that is a portion of the timeframe; and
    adjusting, by the one or more processors, the display of the fetched events in the event series chart according to the associated timestamp and the identification event property value associated with each fetched event, the event series chart comprising a portion of the first portion of the fetched events that occurred with the first frequency and are displayed as separate event icons within the reduced timeframe and a portion of the second portion of the fetched events that occurred with the second frequency that is lower than the first frequency and are displayed as separate event icons within the reduced timeframe.

2. The computer-implemented method of claim 1, comprising selecting one or more log files for enterprise threat detection (ETD) analysis containing logged events associated with the one or more entities.

3. The computer-implemented method of claim 1, wherein the one or more entities are selectable from the group consisting of computing systems, users, servers, proxies, clients, and firewalls.

4. The computer-implemented method of claim 1, wherein the filters is based on a property associated with an event.

5. The computer-implemented method of claim 1, wherein the event series chart comprises two identical time axes.

6. The computer-implemented method of claim 1, comprising enabling zooming and panning functionality for the event series chart.

7. The computer-implemented method of claim 1, comprising enabling tooltip functionality for property values associated with each displayed event in the event series chart.

8. A non-transitory, computer-readable medium storing one or more instructions executable by a computer system to perform operations comprising:
- selecting one or more entities for which logged events are to be displayed in an event series chart;
- selecting one or more filters and a timeframe;
- fetching events from one or more selected log files based on the one or more filters and the timeframe; and
  - generating a display of the fetched events in an event series chart according to an associated timestamp and an identification event property value associated with each fetched event, the event series chart comprising a first portion of the fetched events that occurred with a first frequency that are displayed as a continuous distribution within the timeframe and a second portion of the fetched events that occurred with a second frequency that is lower than the first frequency that are displayed as separate event icons within the timeframe;
- receiving a user input to adjust the display of the fetched events in the event series chart corresponding to a reduced timeframe that is a portion of the timeframe; and
- adjusting the display of the fetched events in the event series chart according to the associated timestamp and the identification event property value associated with each fetched event, the event series chart comprising a portion of the first portion of the fetched events that occurred with the first frequency and are displayed as separate event icons within the reduced timeframe and a portion of the second portion of the fetched events that occurred with the second frequency that is lower than the first frequency and are displayed as separate event icons within the reduced timeframe.

9. The non-transitory, computer-readable medium of claim 8, the operations comprising one or more instructions for selecting one or more log files for enterprise threat detection (ETD) analysis containing logged events associated with the one or more entities.

10. The non-transitory, computer-readable medium of claim 8, wherein the one or more entities are selectable from the group consisting of computing systems, users, servers, proxies, clients, and firewalls.

11. The non-transitory, computer-readable medium of claim 8, wherein the filters is based on a property associated with an event.

12. The non-transitory, computer-readable medium of claim 8, wherein the event series chart comprises two identical time axes.

13. The non-transitory, computer-readable medium of claim 8, the operations comprising enabling zooming and panning functionality for the event series chart.

14. The non-transitory, computer-readable medium of claim 8, the operations comprising enabling tooltip functionality for property values associated with each displayed event in the event series chart.

15. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
  - selecting one or more entities for which logged events are to be displayed in an event series chart;
  - selecting one or more filters and a timeframe;
  - fetching events from one or more selected log files based on the one or more filters and the timeframe; and
  - generating a display of the fetched events in an event series chart according to an associated timestamp and an identification event property value associated with each fetched event, the event series chart comprising a first portion of the fetched events that occurred with a first frequency that are displayed as a continuous distribution within the timeframe and a second portion of the fetched events that occurred with a second frequency that is lower than the first frequency that are displayed as separate event icons within the timeframe;
  - receiving a user input to adjust the display of the fetched events in the event series chart corresponding to a reduced timeframe that is a portion of the timeframe; and
  - adjusting the display of the fetched events in the event series chart according to the associated timestamp and the identification event property value associated with each fetched event, the event series chart comprising a portion of the first portion of the fetched events that occurred with the first frequency and are displayed as separate event icons within the reduced timeframe and a portion of the second portion of the fetched events that occurred with the second frequency that is lower than the first frequency and are displayed as separate event icons within the reduced timeframe.

16. The computer-implemented system of claim 15, the one or more operations comprising one or more instructions for selecting the one or more log files for enterprise threat detection (ETD) analysis containing logged events associated with the one or more entities.

17. The computer-implemented system of claim 15, wherein the one or more entities are selectable from the group consisting of computing systems, users, servers, proxies, clients, and firewalls.

18. The computer-implemented system of claim 15, wherein the filters is based on a property associated with an event.

19. The computer-implemented system of claim 15, wherein the event series chart comprises two identical time axes.

20. The computer-implemented system of claim 15, the one or more operations comprising one or more of:
- enabling zooming and panning functionality for the event series chart; and
- enabling tooltip functionality for property values associated with each displayed event in the event series chart.

* * * * *